(12) United States Patent
Langeder (10) Patent No.: US 8,701,456 B2
(45) Date of Patent: Apr. 22, 2014

(54) ROLL STAND PROVIDED WITH A DISPLACEMENT DEVICE

(75) Inventor: Rudolf Langeder, Mauthausen (AT)

(73) Assignee: Siemens Vai Metals Technologies GmbH (AT)

( * ) Notice: Subject to any disclaimer, the term of this patent is extended or adjusted under 35 U.S.C. 154(b) by 1495 days.

(21) Appl. No.: 12/089,174

(22) PCT Filed: Sep. 26, 2006

(86) PCT No.: PCT/EP2006/009333
§ 371 (c)(1),
(2), (4) Date: Apr. 3, 2008

(87) PCT Pub. No.: WO2007/039187
PCT Pub. Date: Apr. 12, 2007

(65) Prior Publication Data
US 2008/0264134 A1    Oct. 30, 2008

(30) Foreign Application Priority Data
Oct. 3, 2005   (AT) ................................. A1615/2005

(51) Int. Cl.
*B21B 31/18*    (2006.01)

(52) U.S. Cl.
USPC ............................................................. 72/249

(58) Field of Classification Search
USPC .......... 72/237, 241.4, 241.6, 247, 249, 241.2, 72/240; 464/162
See application file for complete search history.

(56) References Cited

U.S. PATENT DOCUMENTS

| | | | |
|---|---|---|---|
| 3,818,743 A | 6/1974 | Kajiwara et al. | |
| 3,857,268 A | 12/1974 | Kajiwaka | |
| 4,898,014 A * | 2/1990 | Ginzburg et al. | ............... 72/247 |
| 4,945,745 A | 8/1990 | Bathory et al. | |
| 7,032,424 B2 | 4/2006 | Schunn et al. | |

FOREIGN PATENT DOCUMENTS

| | | |
|---|---|---|
| DE | 712 855 | 10/1941 |
| DE | 1902665 | 8/1970 |
| DE | 35 04 415 | 8/1986 |
| DE | 39 07 608 | 9/1989 |
| DE | 40 35 941 | 5/1992 |
| DE | 44 10 306 | 7/1995 |
| EP | 1 118 785 | 7/2001 |
| JP | 51-114360 | 10/1976 |
| JP | 59-229211 | 12/1984 |
| JP | 5922911 | 12/1984 |
| JP | 62-3814 | 1/1987 |
| JP | 3-210910 | 9/1991 |
| RU | 2229351 | 5/2004 |
| UA | 18 817 | 11/2006 |
| WO | WO 03/059545 | 7/2003 |
| WO | WO 2007/039187 | 4/2007 |

OTHER PUBLICATIONS

International Search Report dated Dec. 20, 2006, issued in corresponding PCT Applicaton No. PCT/EP2006/009333.
English translation of Office Action dated Mar. 1, 2011 issued in corresponding Japanese Patent Application No. 2008-533909 (3 pages).
Opposition Action dated Apr. 29, 2011 issued in corresponding European Patent Application No. 067922773 with English translation (63 pages.).

* cited by examiner

*Primary Examiner* — Teresa M Ekiert
(74) *Attorney, Agent, or Firm* — Ostrolenk Faber LLP (57) ABSTRACT

A roll stand with at least one pair of rolls mounted in a stand column and drive shafts, particularly cardan shafts, for the rotary drive of the rolls. A coupling for coupling the drive shafts to the rolls. Axial roll displacement is based on a drive shaft which has an actuating arrangement. Further, a method for axial roll displacement is disclosed.

20 Claims, 6 Drawing Sheets

ROLL STAND PROVIDED WITH A DISPLACEMENT DEVICE

CROSS REFERENCE TO RELATED APPLICATION

The present application is a 35 U.S.C. §§371 national phase conversion of PCT/EP2006/009333, filed Sep. 26, 2006, which claims priority of Austrian Application No. A 1615/2005, filed Oct. 3, 2005. The PCT International Application was published in the German language.

BACKGROUND OF THE INVENTION

The invention relates to a roll stand with at least one pair of rolls mounted in a stand column and drive shafts, particularly cardan shafts, for the rotary drive of the rolls, and with a coupling for coupling the drive shafts to the rolls. The invention relates, further, to a method for the axial displacement of at least one roll of a pair of rolls which are driven in rotation via drive shafts and which are mounted in a stand column by means of roll chocks, the axial displacement of the roll taking place together with the roll chocks.

A multiplicity of axial roll displacement devices are known from the prior art. To influence the cross section of the rolling stock, also designated as the rolling stock profile, it is known to displace the rolls in the axial direction and at the same time influence the rolling stock profile in a directed manner via the form of the rolls or its deformation behavior. In this case, it is also necessary to displace rolls driven in rotation. Further, displacement affords a possibility of influencing the wear of the rolls in a directed manner.

From DE 3907608 A1, for example, a drive spindle may be gathered, which makes it possible to drive an axially displaceable roll and can compensate the roll position. The disadvantage of this, however, is that, as before, additional and complicated roll displacement devices are required. Column-fixed displacement devices are often employed for this purpose.

SUMMARY OF THE INVENTION

Proceeding from the prior art, an object of the invention is to provide a substantially simpler and more compact device and a method, which allow a reliable axial displacement of a roll driven in rotation.

The object according to the invention is achieved by means of the roll stand and the features of the drive shaft and roll herein disclosed.

The roll stand provides at least one drive shaft which, on the one hand, allows an axial displacement of one of the rolls of the pair of rolls, but additionally has the function of an actuator, that is to say causes the axial displacement. By means of an actuation arrangement, which is part of the drive shaft, the axial displacement can be transmitted, with a change in the axial length of the drive shaft, to the roll via the coupling and the roll journal. The actuation of the piston/cylinder unit consequently leads to an axial displacement of the roll and to the simple axial positioning of at least one roll. Additional displacement devices mostly fixed to the column or articulated on the column may therefore be dispensed with entirely. By the displacement devices, which are usually arranged on the operating side of a roll stand, being dispensed with, a roll changing device can also be designed to be more compact, since the length of the displacement device increases the roll changing travel additionally by the amount of this length. Furthermore, access to the stand fittings is markedly better by the displacement device fixed to the column being dispensed with. Thus, a roll stand which is markedly more compact, overall, can be produced. Standard cardan shafts, which are modified according to the invention by the provision of a piston/cylinder unit, may advantageously be used as drive shafts.

A coupling allows the releasable connection of the roll to a drive shaft, and in this case, in addition to the rotationally rigid connection, axial forces also have to be absorbed. By means of the coupling, a decoupling of the drive shaft from the rolls is possible in a simple way, so that, for example, a roll change can be carried out quickly.

According to a particular embodiment of the roll stand according to the invention, the actuation arrangement is a piston/cylinder unit. This makes it possible, along with very compact dimensions, to have high axial actuating forces, so that use even under confined conditions of space is possible.

According to an advantageous refinement of the roll stand according to the invention, the drive shaft has, on the motor side, a shaft part fixed in the axial direction and, on the stand side, a shaft part displaceable in the axial direction. By the drive shaft being divided in two, the axial variation in position can be effected and compensated by the drive shaft itself. The fixed motor-side shaft part may in this case be designed conventionally. Where an articulated spindle is concerned, the fixed shaft part carries a shaft joint. The movable shaft part likewise carries a shaft joint and a coupling for coupling the movable shaft part to the roll via the roll journal of the latter.

According to a further advantageous refinement of the roll stand according to the invention, the piston/cylinder unit is connected fixedly, on the cylinder side, to the joint head of the displaceable shaft part. By virtue of this structural refinement, the piston/cylinder unit is connected to the movable shaft part positively and in a stable manner.

According to a further advantageous refinement of the roll stand according to the invention, the piston/cylinder unit is connected, on the piston side, via the piston rod to the joint head of the fixed shaft part in an articulated manner via a connecting joint. By virtue of this measure, tilts or slight skewings, which cannot be ruled out during operation, can be avoided, seals can be protected and therefore a long service life of the piston/cylinder unit and a correspondingly long maintenance time for the drive shaft can be achieved.

According to a special refinement of the roll stand according to the invention, for the radial guidance of the piston rod of the piston/cylinder unit, a guide disk is provided which can be connected fixedly to the piston rod and to the connecting joint. Due to radial guidance, overloads caused by transverse forces on the piston rod and on the cylinder, even in the event of shocks or brief load peaks, can be effectively prevented, and therefore damage to the piston/cylinder unit or to the connecting joint can be avoided.

In a particular embodiment of the roll stand according to the invention, the two parts of the drive shaft engage telescopically one in the other in the axial direction, while changes in the axial length of the drive shaft can be compensated. The overall length change is in this case achieved by means of shaft parts overlapping one another telescopically, so that a highly compact drive or roll stand is achieved. Moreover, owing to the telescopic design, standard components can largely be used.

According to an alternative refinement of the roll stand according to the invention, the movable shaft part has an external rotary leadthrough for the hydraulic supply of the piston/cylinder unit. By virtue of this supply, a simple structural solution is implemented, while a reliable supply of the spatially movable piston/cylinder unit, even under rough operating conditions of the rolling mill, can be ensured.

In a further embodiment of the roll stand according to the invention, the piston/cylinder unit is integrated in a recess in the drive shaft, the axes of the piston/cylinder unit and of the drive shaft coinciding.

Installation in a recess constitutes a highly compact and space-saving design, the greatest possible protection for the piston/cylinder unit being afforded. On account of the mounting, there are also no unbalances which could lead to vibrations. Standard versions modified according to the invention may be employed as drive shafts, and therefore tested mechanical components can be adopted.

According to one possible refinement of the roll stand according to the invention, an external path measurement system for detecting the axial position of the displaceable shaft part is provided on the drive shaft, this path measurement system being arranged between a protective cover and an accompanying nose for torque support for the rotary leadthrough. By virtue of these measures, a reliable and fault-free measuring arrangement can be ensured even under rolling mill conditions. The protective cover is mounted in a carrying structure.

According to an advantageous refinement of the roll stand according to the invention, the roll has a roll journal which comprises two thrust pieces, guided in a sleeve and spring-loaded, for the positive coupling of the roll journal to the coupling. Through the thrust pieces being arranged in the roll journal, a highly robust coupling arrangement is provided, while the coupling itself can have an even simpler construction and manages without any media supply. The coupling is distinguished by long service lives, along with a low outlay in maintenance terms.

In a particular version of the roll stand according to the invention, the roll can be coupled to the axially displaceable shaft part by means of the spring-loaded thrust pieces latching automatically in recesses of the coupling. A reliable, quick and simple coupling operation can consequently be ensured, so that short roll changing times can be implemented.

According to a further advantageous refinement of the roll stand according to the invention, at least one laterally adjustable spindle head mounting with holding elements for fixing the drive shaft in position is provided, the spindle head mounting having two actuating arrangements for the displacement of the thrust pieces in order to release the connection between the roll and the axially displaceable shaft part. During the release of the connection between the roll and coupling, it is necessary to keep the drive shaft in position. For this purpose, laterally introducible spindle head mountings are employed. The adjustment of this spindle head mounting may take place by hydraulic actuation. The drive shaft is mostly clamped between two reception elements of the spindle head mounting. In addition to this function, the spindle head mounting also assumes the unlocking of the roll from the drive shaft or from the coupling provided for this purpose. The roll can be decoupled from the drive shaft by the actuation of the thrust pieces by means of pneumatic or, alternatively, also hydraulic cylinders as actuating arrangements.

An alternative refinement of the roll stand according to the invention provides unlocking pistons, arranged radially in the coupling, for transmitting the force of the actuating arrangements to the thrust pieces. By means of these unlocking pistons, an actuating arrangement can displace a thrust piece for unlocking, no deep penetration to the coupling being required, and a low stroke being sufficient for unlocking.

According to one possible version of the roll stand according to the invention, the driven pair of rolls is formed by working rolls of a four-high stand. In four-high stands, it is possible, by the axial adjustment of the working rolls, to set the roll nip and consequently the rolling stock profile in a directed manner. By virtue of the stand according to the invention, a particularly advantageous working roll adjustment is possible, since any displacement devices fixed to the column may be dispensed with. This gives rise to a highly space-saving stand or stand drive.

In a special refinement of the roll stand according to the invention, the rolls are mounted in the stand column by means of roll chocks, and the latter are displaceable axially together with the roll. By a displacement arrangement fixed to the stand column being dispensed with, simpler roll chocks can be produced, while these can be displaced together with the rolls. Complicated coupling arrangements with a roll displacement arrangement may be dispensed with entirely.

According to a further possible version of the roll stand according to the invention, the driven pair of rolls is formed by intermediate rolls of a six-high stand. Here, too, a highly advantageous stand is formed, while, in particular, dispensing with operating-side roll adjustment arrangements is advantageous.

The object according to the invention is achieved, further, by means of the method disclosed herein.

By the function of the rotary drive and that of an axial actuating arrangement being coupled in at least one drive shaft of a pair of rolls, the overall axial displacement can be effected by means of the drive train itself. There is therefore no need for any additional actuating systems. The axial displacement is also applied by means of the movable shaft part to the roll which is coupled to the movable shaft part via a coupling. The drive shaft compensates the axial displacement between the movable and a fixed motor-side shaft part, the parts engaging telescopically one in the other. The movable shaft part acts as an actuator for the axial roll displacement. By the rotary drive and axial roll displacement functions being connected, a simpler rolling method can also be achieved, because adaptions of the rolling situation by means of axial roll displacement are not formed by hydraulic systems which influence one another and may in this case lead to faults. On account of a centrally engaging actuator, optimal force introduction is ensured. In addition, in conventional displacement devices, at least two piston/cylinder units are required for each roll, a higher outlay in terms of plant and of control being necessary here for synchronizing the displacement movements. Undesirable tilts between the two piston/cylinder units are also no longer to be expected in the method according to the invention with central force introduction into the drive shaft or the roll.

In the automatic control of a roll stand of this type in rolling operation, therefore, a simpler automatic control behavior is to be expected.

A particularly advantageous refinement of the method according to the invention is achieved in that both rolls of a pair of rolls are displaced axially, the axial displacements in each case being imparted by a movable shaft part or its piston/cylinder unit. By virtue of the additional axial displacement, the rolling profiles can be influenced even better, once again a highly advantageous adjustment behavior resulting from adjustment directly via the movable shaft part.

A further advantageous refinement of the method according to the invention is achieved in that the movable shaft part imparts the axial displacement in an automatically controlled manner by means of an actuator. By virtue of the direct adjustment behavior in the actuation of the actuator for displacing the movable shaft part, it is possible to achieve an optimal automatic control behavior, so that unwanted changes in the rolling profile can be eliminated very quickly. Particularly in a closed control loop, a highly advantageous automatic control behavior can be achieved by means of this roll displacement.

According to a further advantageous refinement of the method according to the invention, the axial displacement of the movable shaft part takes place in an automatically controlled manner on the basis of a model and/or of measured rolling variables, in particular of the rolling stock profile. The combination of the automatically controlled displacement with modeled or measured variables allows a very quick and accurate axial positioning of the rolls, so that very narrow rolling tolerances can be achieved on the rolled product.

The invention is described in more detail, by way of example and not restrictively, with reference to the following figures.

DESCRIPTION OF A PREFERRED EMBODIMENT

Figure 1:
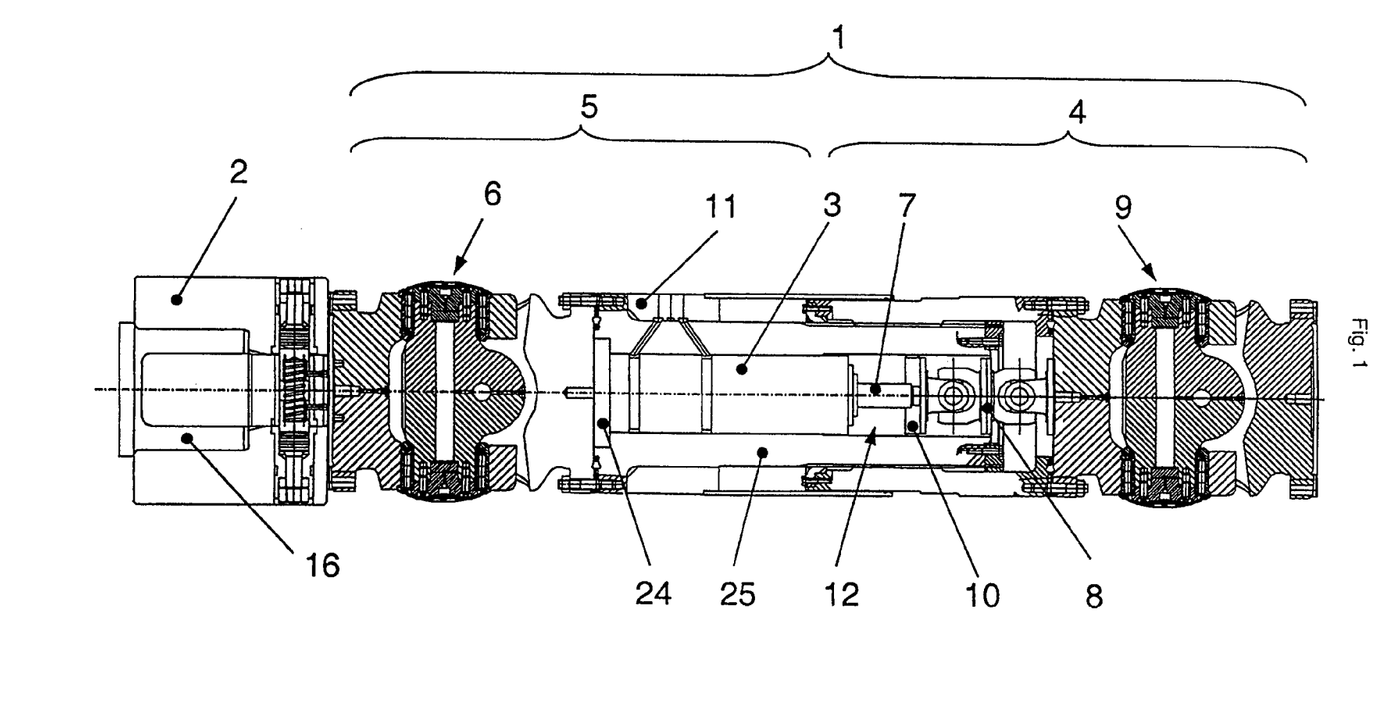
FIG. 1 shows the drive shaft according to the invention and the roll journal in a sectional illustration parallel to the shaft axis.

FIG. 1 illustrates, in the form of a detail, the drive shaft (1) with the two shaft parts (4) and (5). The shaft part (4) is arranged on the motor side and fixedly, while the shaft part (5) is arranged movably in the axial direction. The drive shaft (1) serves for driving a roll, while height displacements and axial position changes can be compensated correspondingly by means of the drive shaft (1). The shaft (1) illustrated has two joint heads (6, 9). A piston/cylinder unit (3) for the axial displacement of the movable shaft part (5) is arranged in a recess (12), the cylinder being fixed between the joint head (6) and the drive shaft inner part (25) by means of a cylinder flange (24). The piston rod (7) is guided in the radial direction in the drive shaft inner part (25) by means of a guide disk (10). The piston rod (7) is connected to the joint head (9) via the guide disk (10) and a connecting joint (8), while unavoidable axial displacements can be compensated and therefore damage to the piston/cylinder unit (3) can be avoided. The piston/cylinder unit (3) is supplied hydraulically via an external rotary leadthrough (11) known per se, which is not described in any more detail. The coupling (2) serves for the quick and simple coupling of the roll to the coupling (2) via the roll journal (16).

Figure 2:
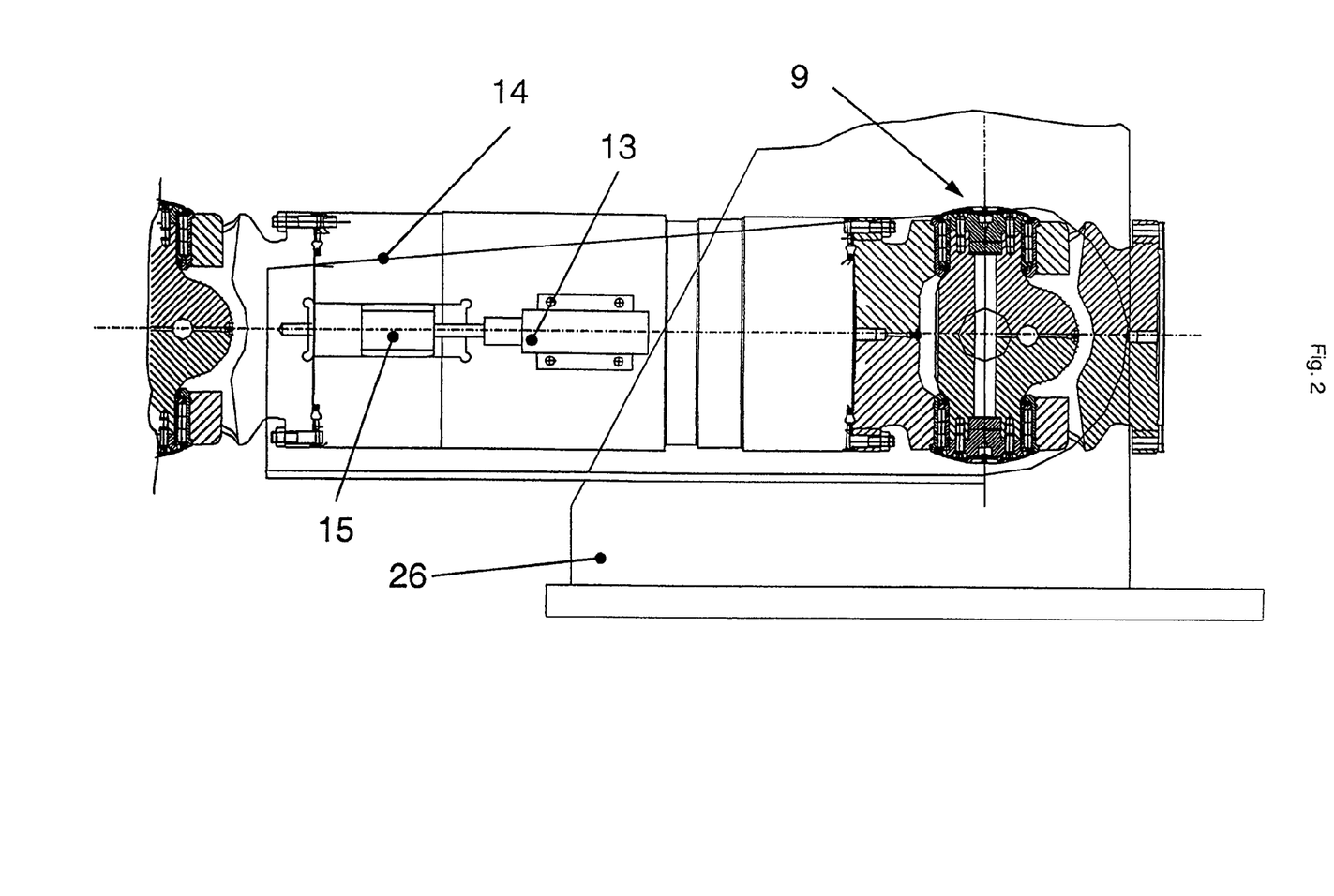
FIG. 2 shows part of the drive shaft according to the invention and of the protective cover with a carrying structure.

FIG. 2 shows a detail of the drive shaft (1) and the arrangement of the protective cover (14) on a lower drive shaft (1). A protective cover is also provided correspondingly for an upper drive shaft. The protective cover is mounted movably in a fixed carrying structure (26). Provided on the outside of the protective cover (14) is a path measurement (13), this being connected to the accompanying nose (15) of the torque support for the rotary leadthrough (11).

Figure 3:
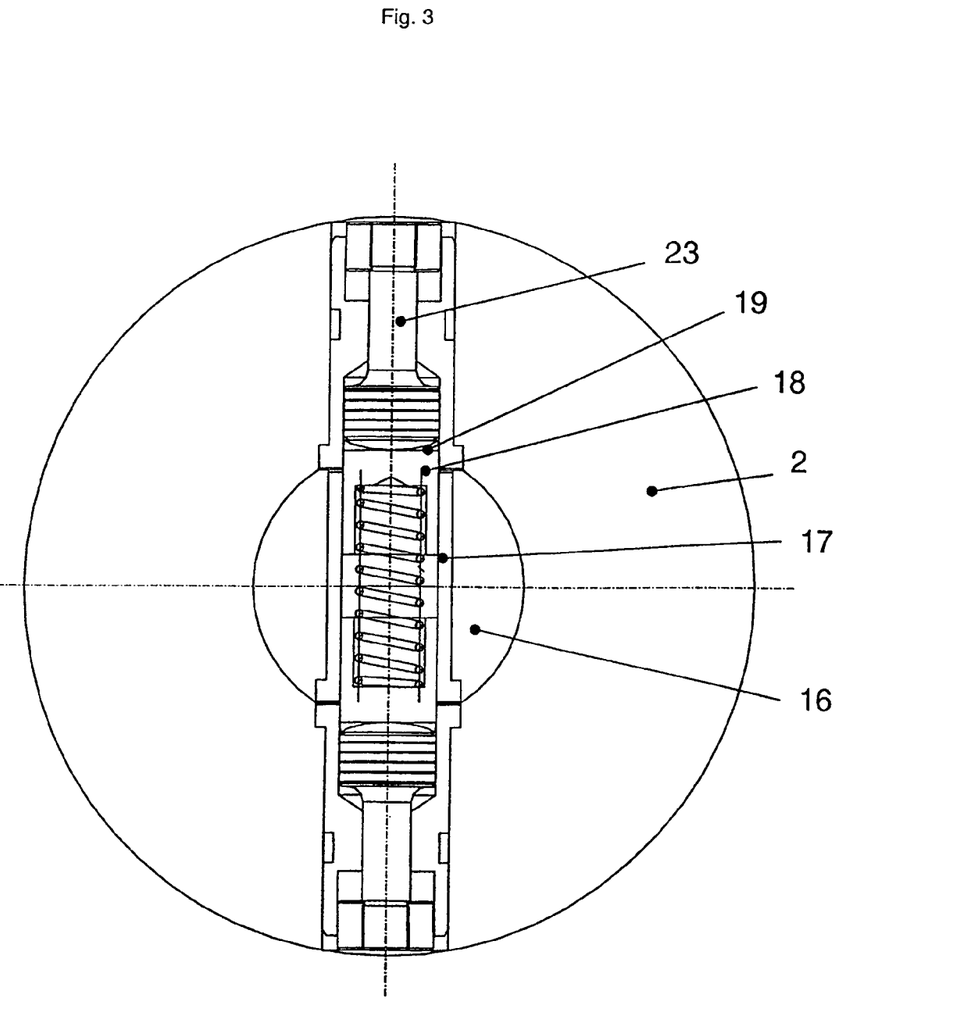
FIG. 3 shows the coupling according to the invention and the shaft journal in a sectional illustration transverse to the coupling axis.

FIG. 3 illustrates, as a detail, a section transversely to the axis of the coupling (2). The coupling (2) has recesses in which the radially arranged unlocking pistons (23) are mounted movably. These unlocking pistons (23) serve for force transmission to the thrust pieces (18) and are given in more detail in FIG. 4. The shaft journal (16) has two thrust pieces (18) mounted in a sleeve (17), these being prestressed with respect to one another by means of a spring. By virtue of the thrust pieces (18), the connection between the coupling (2) and the roll journal (16) is made positively. For decoupling, the thrust pieces (18) are pressed together counter to the spring force and the coupling is thus released.

Figure 4:
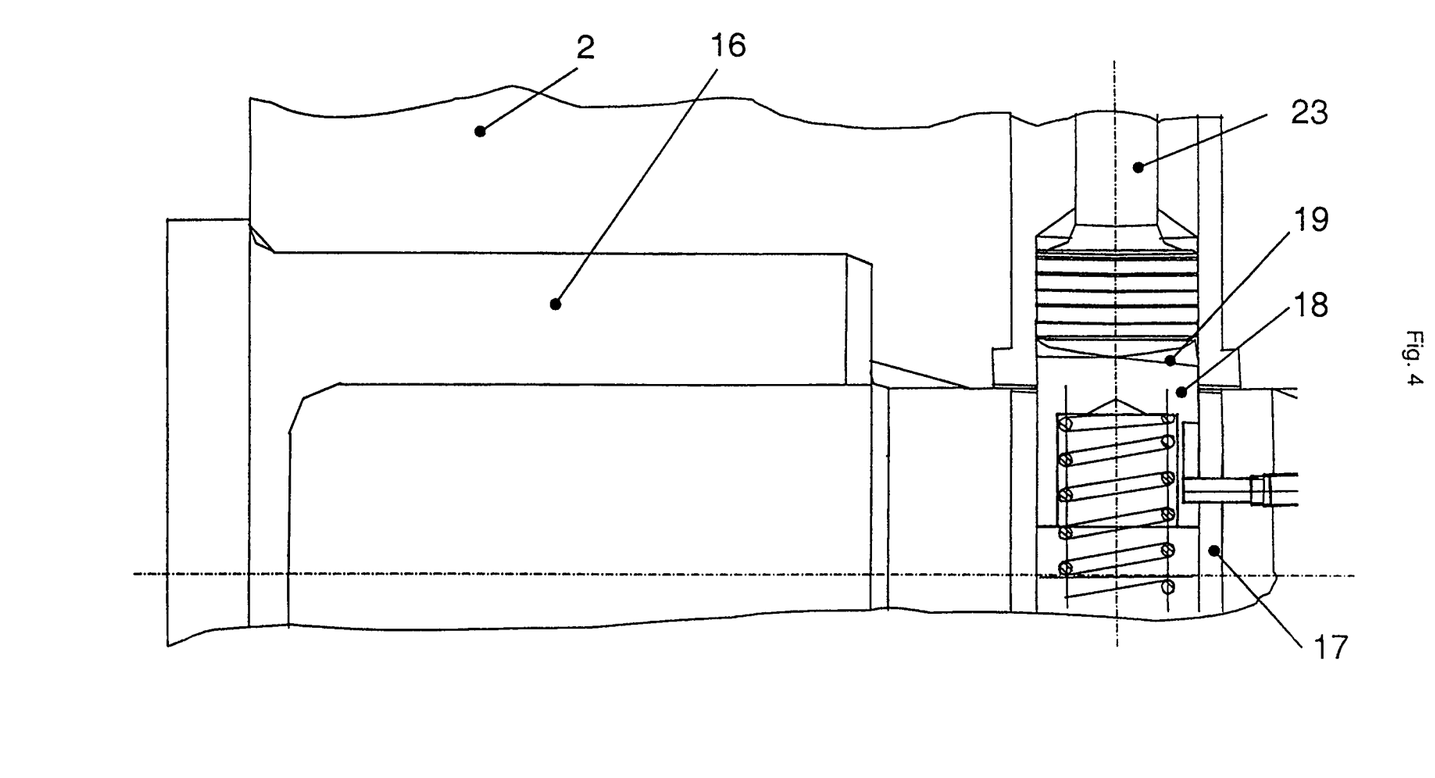
FIG. 4 shows the coupling according to the invention and the shaft journal in a sectional illustration parallel to the coupling axis.

FIG. 4 shows in the form of a detail the coupling (2) and the thrust pieces (18) in the locked state, that is to say with a positive connection between the coupling (2) and the roll journal (16). The coupling (2) is not illustrated fully in FIG. 4. In order to allow an automatic locking of the coupling (2) with the roll journal (16), the thrust pieces (18) prestressed via springs have a slope (19), so that, when the roll or the roll journal (16) moves into the coupling (2), the thrust pieces (18) are first pressed together with respect to the coupling (2) and then automatically make a positive connection with the coupling (2) by means of the spring.

Figure 5:
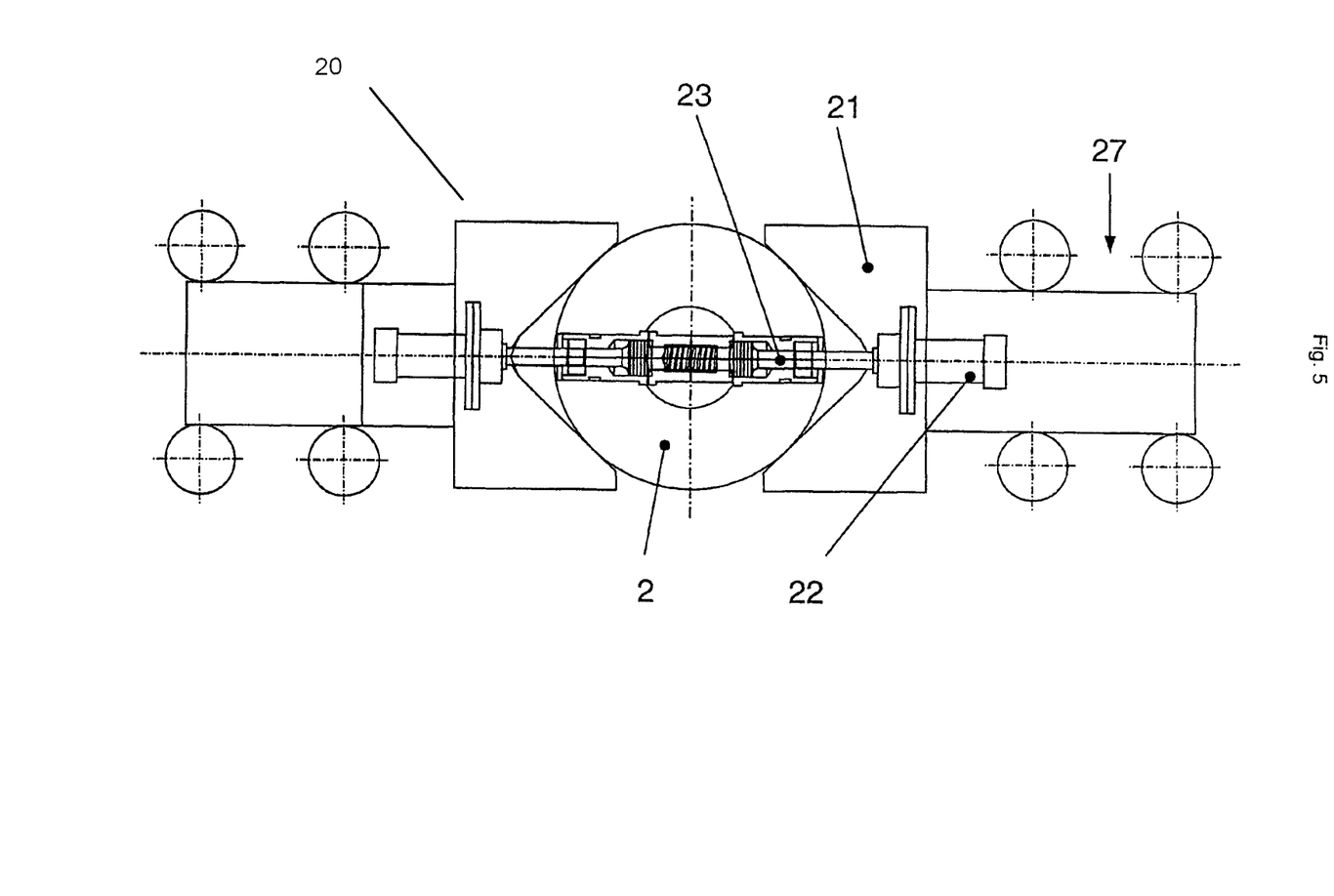
FIG. 5 shows the coupling according to the invention and the spindle head mounting in a sectional illustration transverse to the coupling axis.

FIG. 5 shows the spindle head mounting (20) in the introduced position, the coupling (2) and the shaft (1) being fixed in their position by means of the two holding elements (21), so that this position is maintained even after the roll has been drawn off from the coupling. Coupling to a new roll, for example after a roll change, is thereby made possible. The spindle head mounting (20) has two actuating arrangements (22). These press onto the thrust pieces (18) via the unlocking pistons (23), the spring being compressed and consequently the roll journal (16) being unlocked. The spindle head mounting (20) has an adjusting arrangement (27), so that it can be moved out of the drive shaft region during normal operation. Adjustment may take place by means of hydraulic or else electromechanical actuation.

Figure 6:
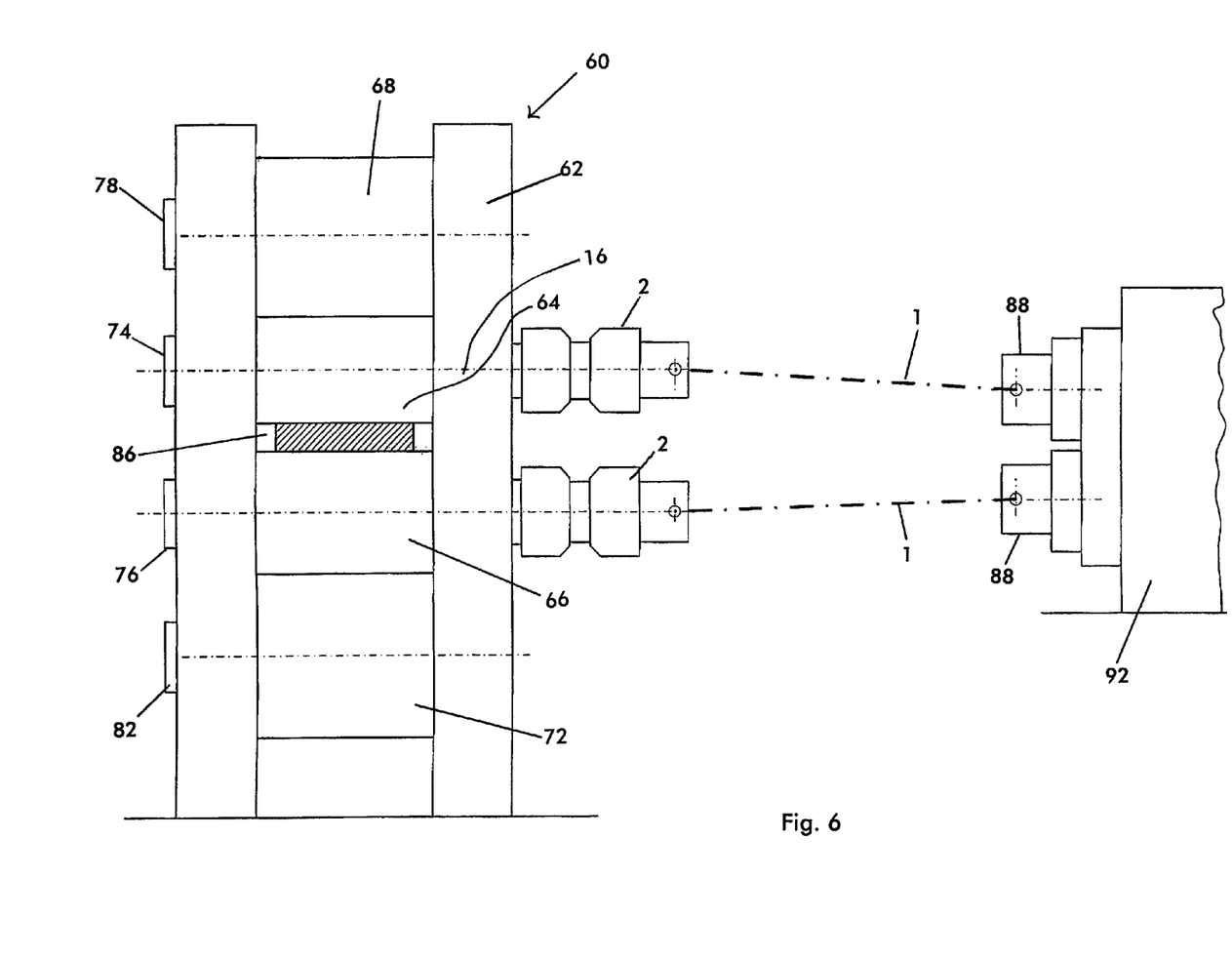
FIG. 6 is a schematic showing of a mill roll stand illustrating its elements and cooperation with the drive shafts for the work rolls in the mill stand housing.

FIG. 6 illustrates a mill stand housing including the elements and components described earlier in the specification.

A mill stand housing includes the housing 62 comprised of two stand columns which supports an array of rolls comprised of at least two driven work rolls 64 and 66 which are driven to rotate and at least one respective non-driven backup roll 68 for work roll 64 and one respective backup roll 72 for work roll 66. All four rolls, 64, 66, 68 and 72, comprise a stack of at least four high, and additional backup rolls may be used so the stack includes six rolls, etc.

All of the rolls are supported for rotation in respective roll chocks 74, 76, 78 and 82, which are at opposite sides of the rolls in the housing, and the rolls are supported to extend generally parallel. Each of the work rolls in the column of rolls in the mill stand includes respective roll chocks, which are axially displaceable together with their respective work rolls.

The work rolls are positioned to define a gap 86 between them which is of a size and shape to control the profile of metal strip that is passed between the work rolls. The backup rolls 68 and 72 support and maintain the orientation of the respective work rolls and reduce work roll deflection or bending.

At least one of the work rolls is described above and illustrated in other Figures. Both of the work rolls are driven to rotate so as to move the strip and shape and profile it as it passes through the gap 86. At one side of the mill stand 62, near a respective roll chock at that side, there is a respective coupling 2 at the shaft 1 which is coupled to a respective journal of the work roll such that driving the shaft 1 will, via the coupling and the journal, rotate the respective attached roll 64 or 66.

As noted above, each work roll 64, 66 includes a sleeve, and at the sleeve, the roll chock is comprised of the thrust pieces 18 which are spring loaded for assuring positive coupling of the roll journal 16 to the coupling 2.

There is a drive shaft 1, shown in detail in the other drawing Figures hereof, which is attached to the coupling in the manner described above in order to rotate the work roll. The drive shaft additionally is axially displaceable along with the respective work roll to urge the coupling and the respective work roll to be adjusted axially in and with respect to the mill stand, also as described above. To allow axial shifting of each work roll, the respective drive shaft must allow and follow the axial movement of the driven roll, even during rolling operation. The adjustable drive shaft remains with the roll it drives and this may avoid need for another external roll actuator. The drive shaft 1, is in turn, coupled at 88 to a gear box 92 which drives the shaft 1 to rotate, thereby to drive the work rolls.

The invention claimed is:

1. A roll stand having at least one pair of rolls mounted in a stand column and having drive shafts operable for the rotary drive of the rolls, the roll stand comprising:
   a coupling for coupling each drive shaft to a respective one of the rolls,
   wherein at least one of the drive shafts includes at least one actuating arrangement operable to generate axial displacement of the drive shaft resulting in a change in axial length of the drive shaft,
   the actuating arrangement comprising a piston/cylinder unit integrated in a recess of the drive shaft such that the axes of the piston/cylinder unit and the drive shaft coincide, and
   wherein the drive shaft is configured to be coupled to the roll via the coupling such that the coupled roll is also displaced axially by the axial displacement of the drive shaft generated by the actuating arrangement.

2. The roll stand as claimed in claim 1, wherein the drive shaft has a motor side which includes a first shaft part that is fixed in the axial direction with respect to the roll stand and, the drive shaft has a stand side that includes a second shaft part that is displaceable in the axial direction with respect to the roll stand.

3. The roll stand as claimed in claim 2, wherein the piston/cylinder unit includes a cylinder side that is connected fixedly to a joint head of the second shaft part.

4. The roll stand as claimed in claim 3, wherein the piston/cylinder unit includes a piston side that is connected via a piston rod to a joint head of the first shaft part in an articulated manner via a connecting joint.

5. The roll stand as claimed in claim 4, wherein the piston rod is further comprises a guide disk which is connected to the piston rod and to the connecting joint for radial guidance of the piston rod.

6. The roll stand as claimed in claim 2, wherein the first and second parts of the drive shaft engage telescopically one in the other in the axial direction.

7. The roll stand as claimed in claim 2, wherein the second shaft part has an external rotary leadthrough for a hydraulic supply of the piston/cylinder unit.

8. The roll stand as claimed in claim 2, further comprising an external path measurement system on the drive shaft and operable for detecting an axial position of the second shaft part arranged between a protective cover and an accompanying nose for torque support for the rotary leadthrough.

9. The roll stand as claimed in claim 8, further comprising radially arranged unlocking pistons operable for transmitting force of the actuating arrangements to the thrust pieces and provided in the coupling.

10. The roll stand as claimed in claim 1, wherein at least one of the rolls has a sleeve, and a roll journal which comprises two thrust pieces which are guided in the sleeve and are spring-loaded, the thrust pieces operable for positive coupling of the roll journal to the coupling.

11. The roll stand as claimed in claim 10, wherein the at least one roll is coupled to the second shaft part by the spring-loaded thrust pieces, and the coupling having recesses in which the thrust pieces latch automatically.

12. The roll stand as claimed in claim 11, wherein the thrust pieces have outer end faces that are sloped for enabling the automatic latching, wherein the slope is arranged on a cardan shaft side and at an inclination to the coupling axis.

13. The roll stand as claimed in claim 10, further comprising at least one laterally adjustable spindle head mounting with holding elements for fixing the drive shaft in position, the spindle head mounting having two actuating arrangements for displacement of the thrust pieces in order to release the connection between the roll and the second shaft part.

14. The roll stand as claimed in claim 1, wherein the rolls are mounted in a column of the stand by means of respective roll chocks, and the roll chocks are displaceable axially together with the roll.

15. The roll stand as claimed in claim 1, wherein the pair of rolls is formed by working rolls of a four-high roll stand and the stand includes the pair of working rolls and respective backup rolls.

16. The roll stand as claimed claim 1, wherein the pair of rolls is formed by intermediate rolls of a six-high stand including a pair of rolls.

17. A method for axially displacing at least one roll of a pair of rolls, the rolls being driven in rotation via drive shafts and the rolls being mounted in a stand column by means of roll chocks, the method comprising:
   axially displacing the at least one roll along with the respective roll chocks,
   coupling the at least one roll to a movable shaft part of a drive shaft via a coupling,
   axially displacing the roll by axially displacing the movable shaft part, wherein the movable shaft part and a fixed shaft part receive the overall axial displacement, and the axial displacement is imparted by the movable shaft part itself.

18. The method as claimed in claim 17, further comprising axially displacing both rolls of the pair of rolls, wherein the axial displacement in each case is imparted by the movable shaft part.

19. The method as claimed in claim 18, wherein the movable shaft part imparts the axial displacement in an automatically controlled manner by means of an actuator.

20. The method as claimed in claim 18, wherein the axial displacement of the movable shaft part takes place in an automatically controlled manner on the basis of at least one of a model and a measured rolling variable of the rolling stock profile.

* * * * *

UNITED STATES PATENT AND TRADEMARK OFFICE
CERTIFICATE OF CORRECTION

PATENT NO. : 8,701,456 B2  
APPLICATION NO. : 12/089174  
DATED : April 22, 2014  
INVENTOR(S) : Rudolf Langeder Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1627 days.

Signed and Sealed this
Twenty-ninth Day of September, 2015

Michelle K. Lee
*Director of the United States Patent and Trademark Office*